Jan. 17, 1967   J. J. MANNING   3,298,294
CAMERA APPARATUS ESPECIALLY ADAPTED FOR THE
PHOTOGRAPHIC IDENTIFICATION OF HORSES
Filed Oct. 27, 1964   12 Sheets-Sheet 1

INVENTOR
James J. Manning
BY
ATTORNEYS

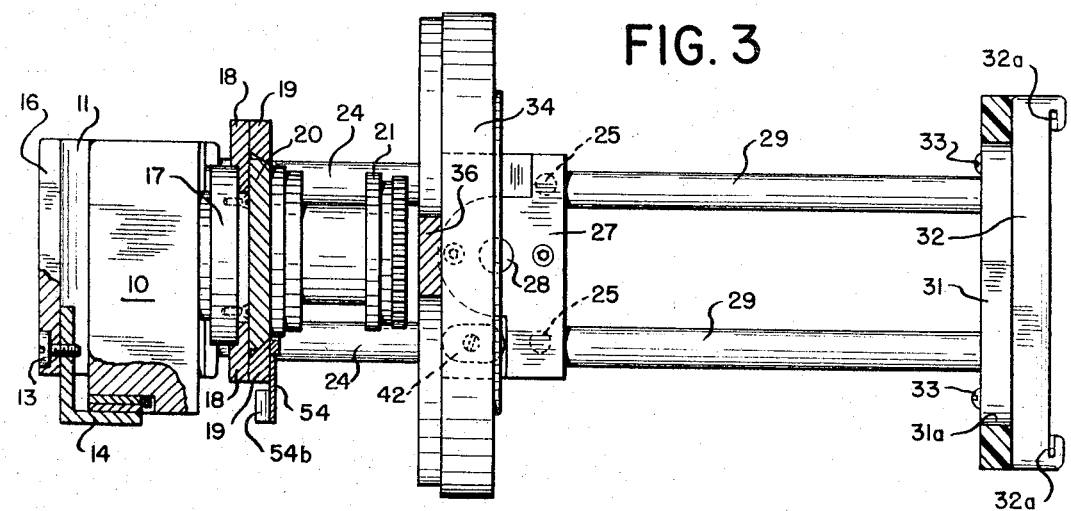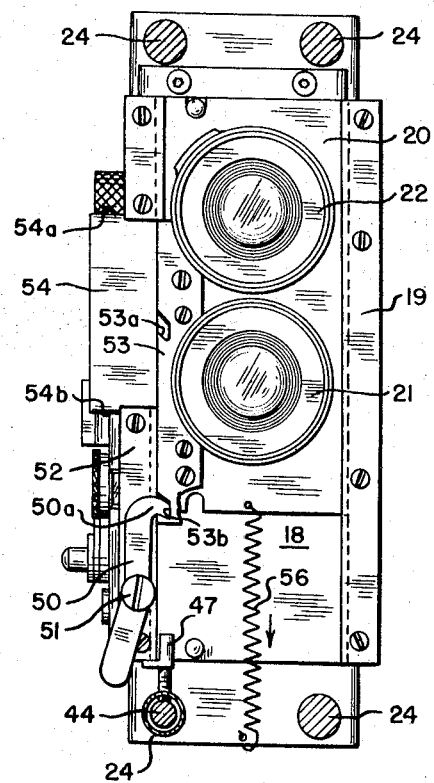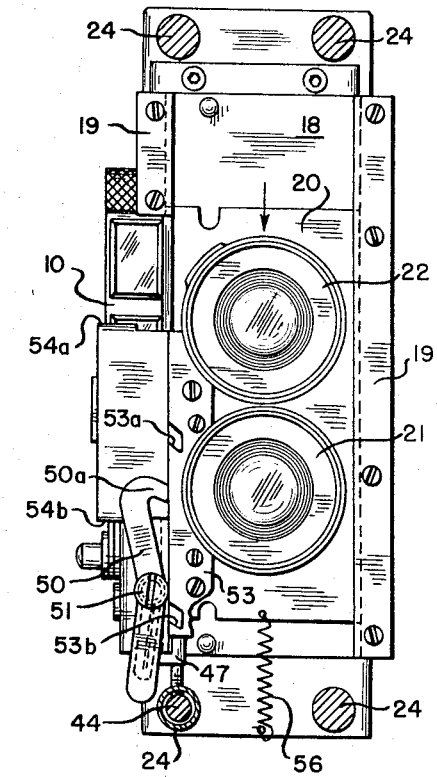

Jan. 17, 1967 J. J. MANNING 3,298,294
CAMERA APPARATUS ESPECIALLY ADAPTED FOR THE
PHOTOGRAPHIC IDENTIFICATION OF HORSES
Filed Oct. 27, 1964 12 Sheets-Sheet 3

INVENTOR
James J. Manning
BY
ATTORNEYS

Jan. 17, 1967   J. J. MANNING   3,298,294
CAMERA APPARATUS ESPECIALLY ADAPTED FOR THE
PHOTOGRAPHIC IDENTIFICATION OF HORSES
Filed Oct. 27, 1964   12 Sheets-Sheet 4

INVENTOR
James J. Manning
BY
ATTORNEYS

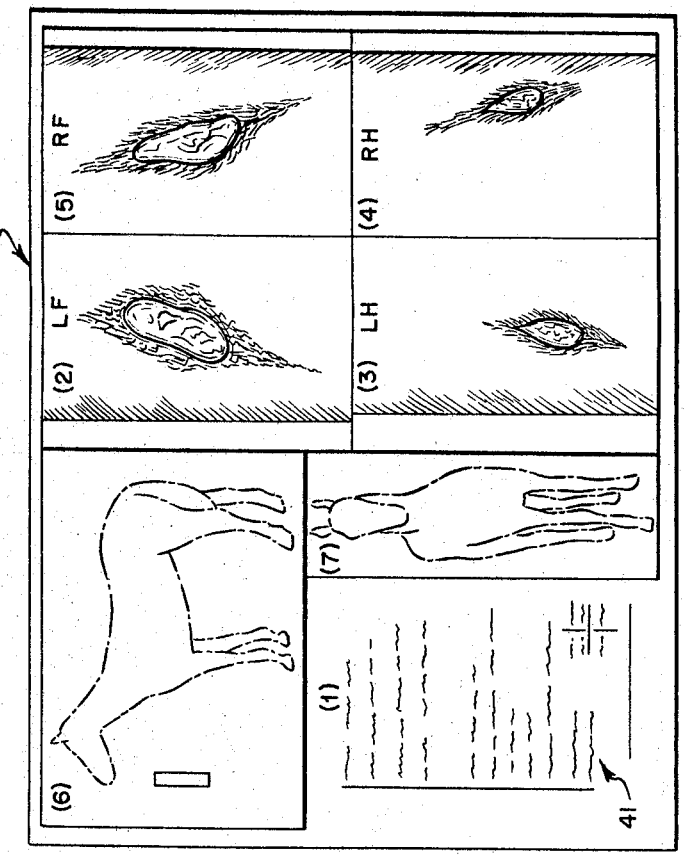

Jan. 17, 1967    J. J. MANNING    3,298,294
CAMERA APPARATUS ESPECIALLY ADAPTED FOR THE
PHOTOGRAPHIC IDENTIFICATION OF HORSES
Filed Oct. 27, 1964    12 Sheets-Sheet 6

INVENTOR
James J. Manning
BY
ATTORNEYS

INVENTOR.
JAMES J. MANNING

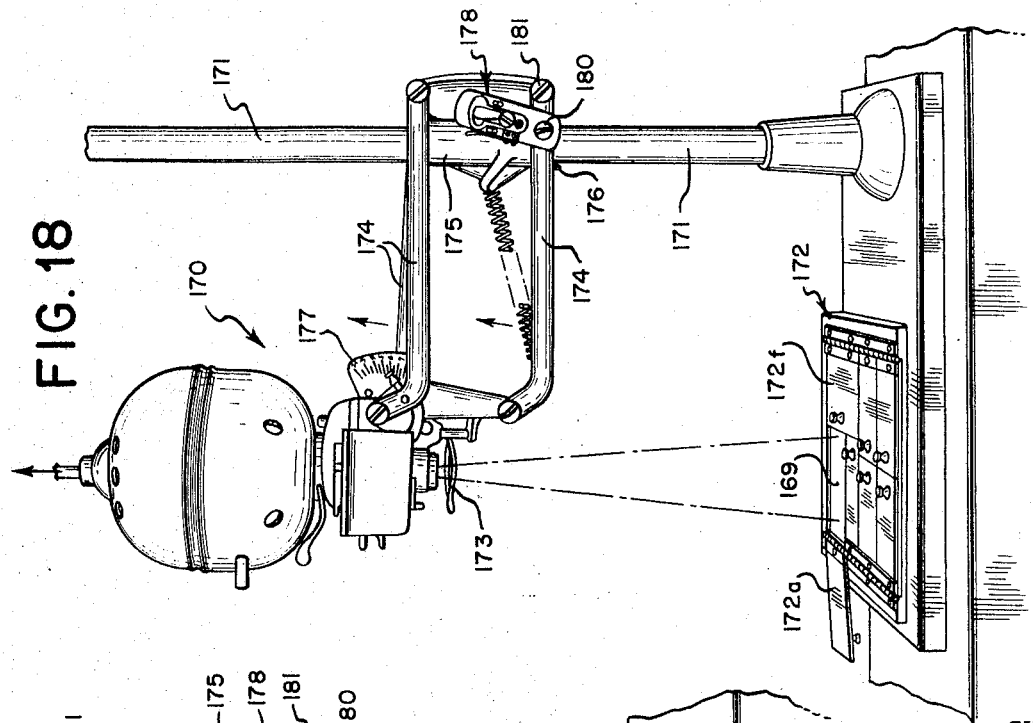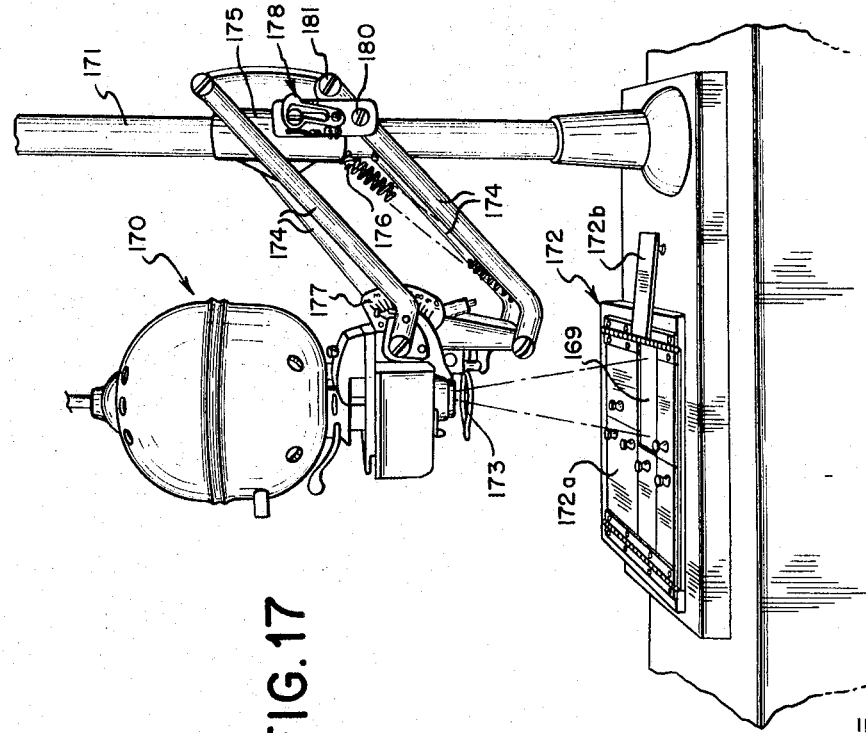

Jan. 17, 1967   J. J. MANNING   3,298,294
CAMERA APPARATUS ESPECIALLY ADAPTED FOR THE
PHOTOGRAPHIC IDENTIFICATION OF HORSES
Filed Oct. 27, 1964   12 Sheets-Sheet 9
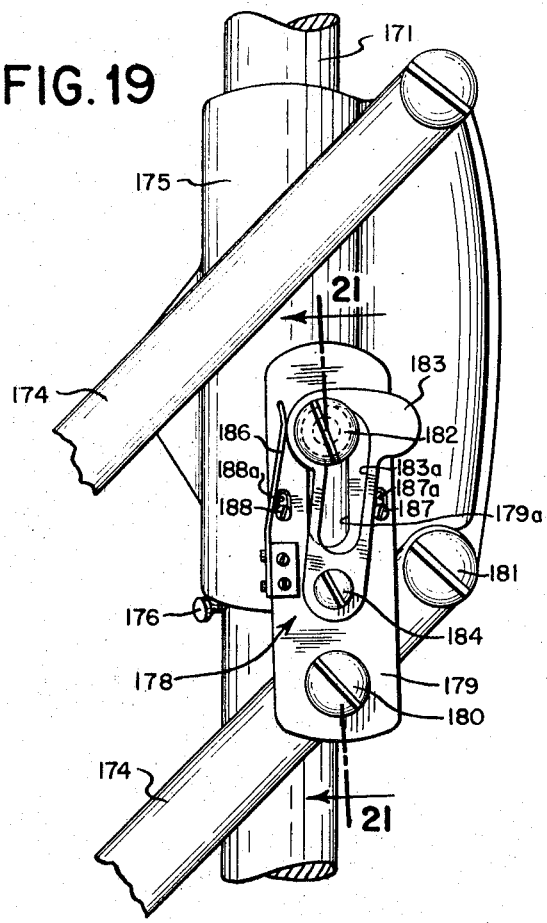
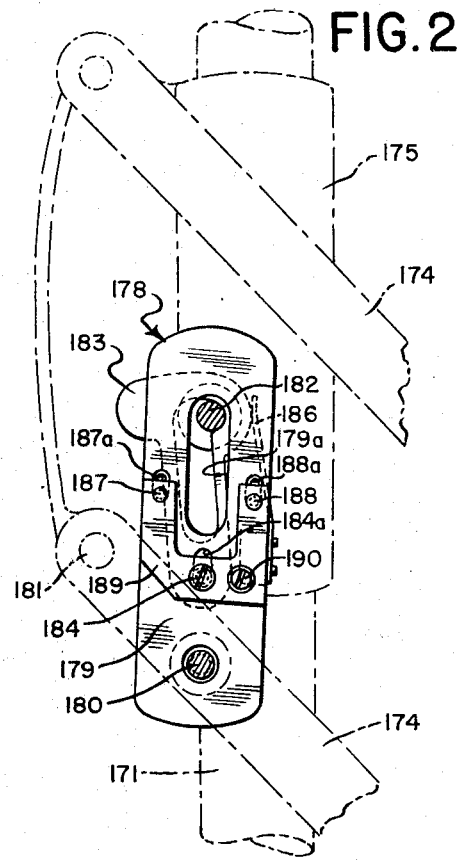
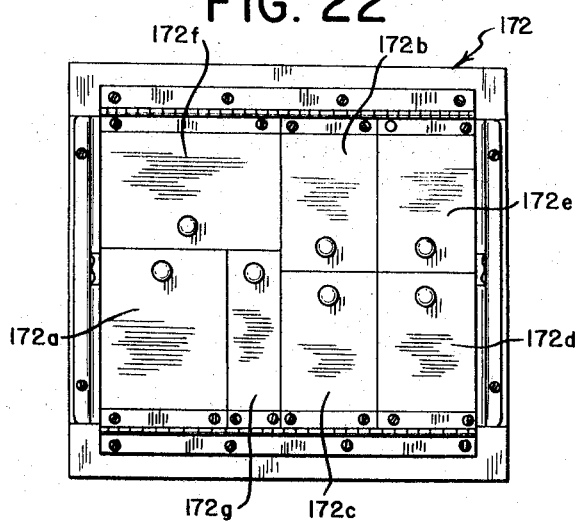
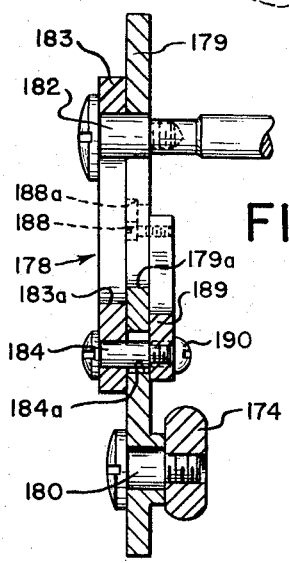
INVENTOR
James J. Manning
BY
Morton, Taylor and Adams
ATTORNEYS

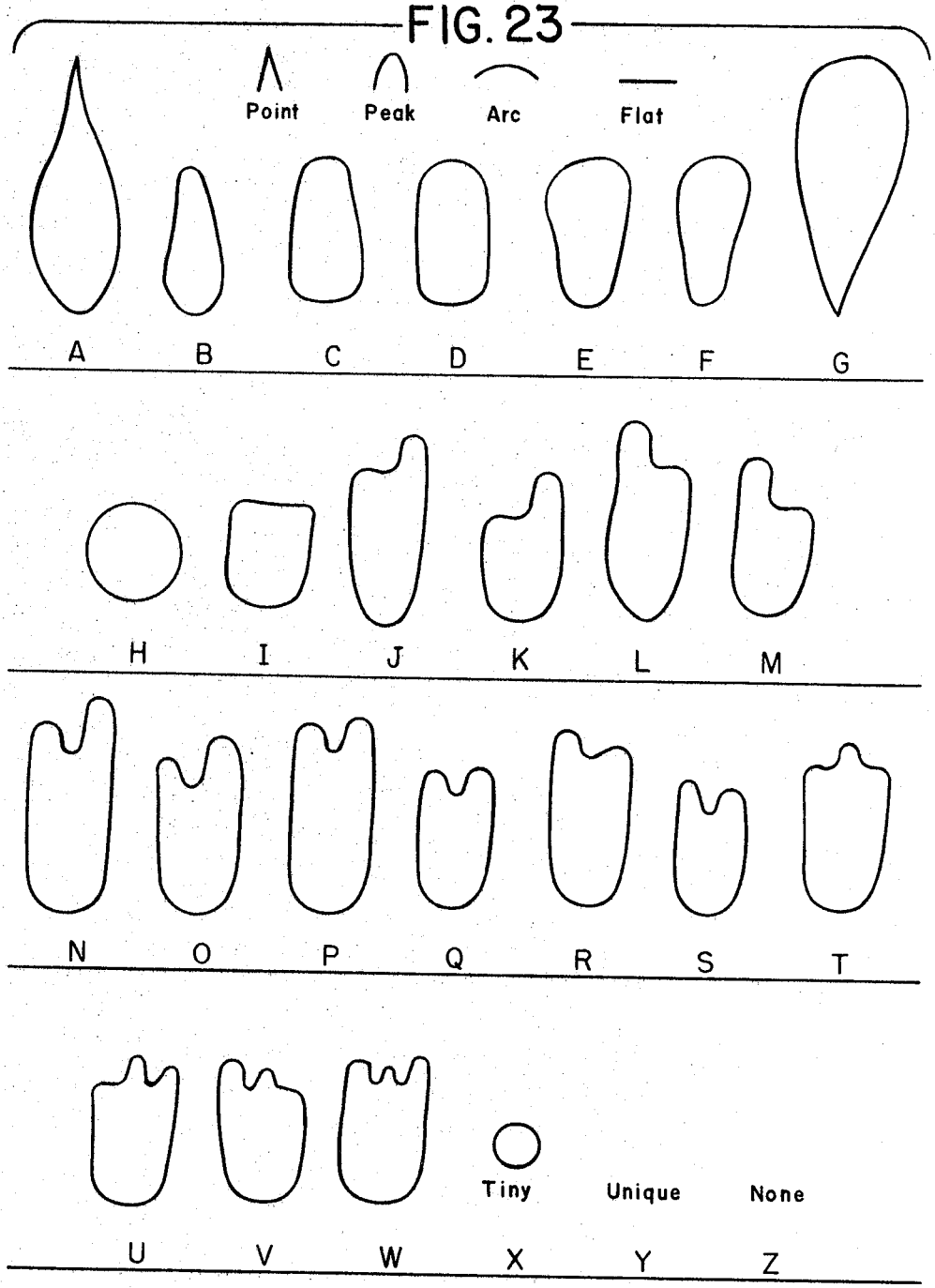

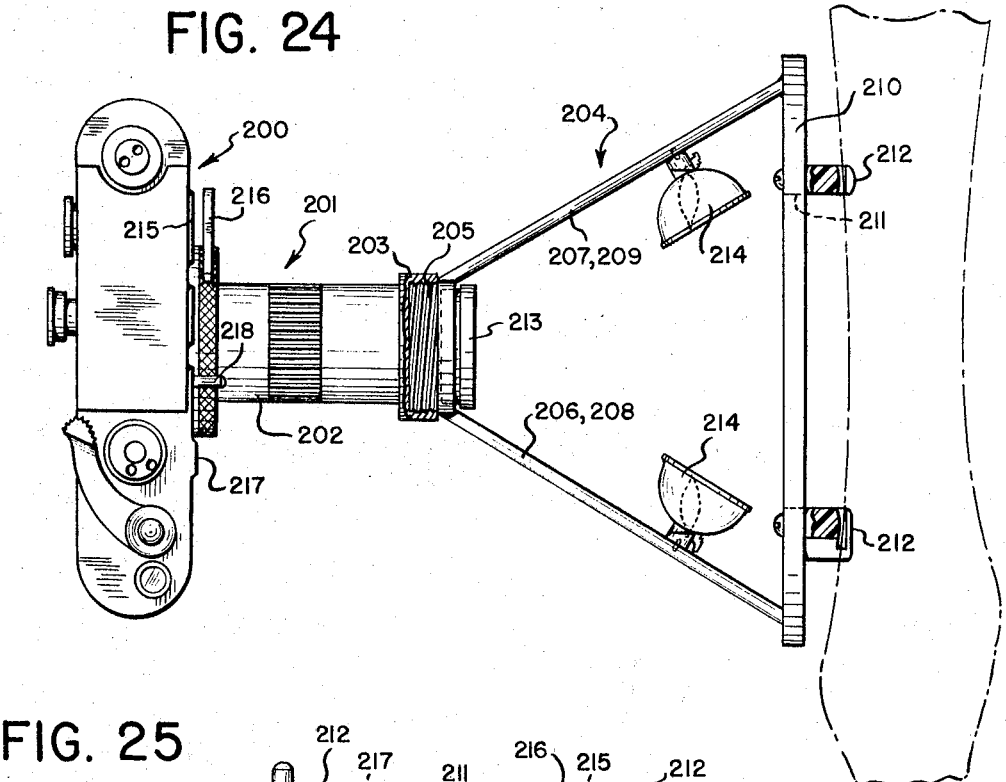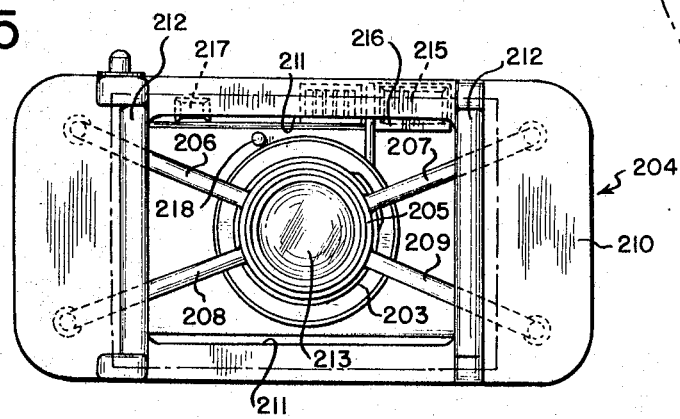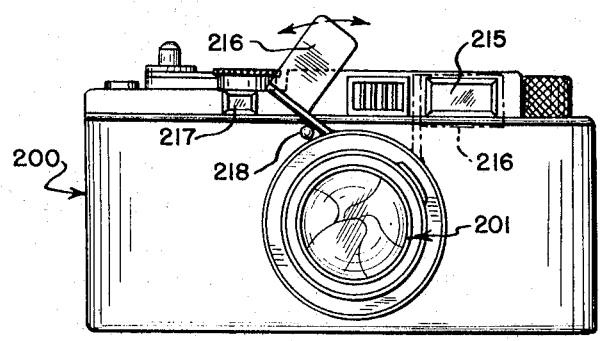

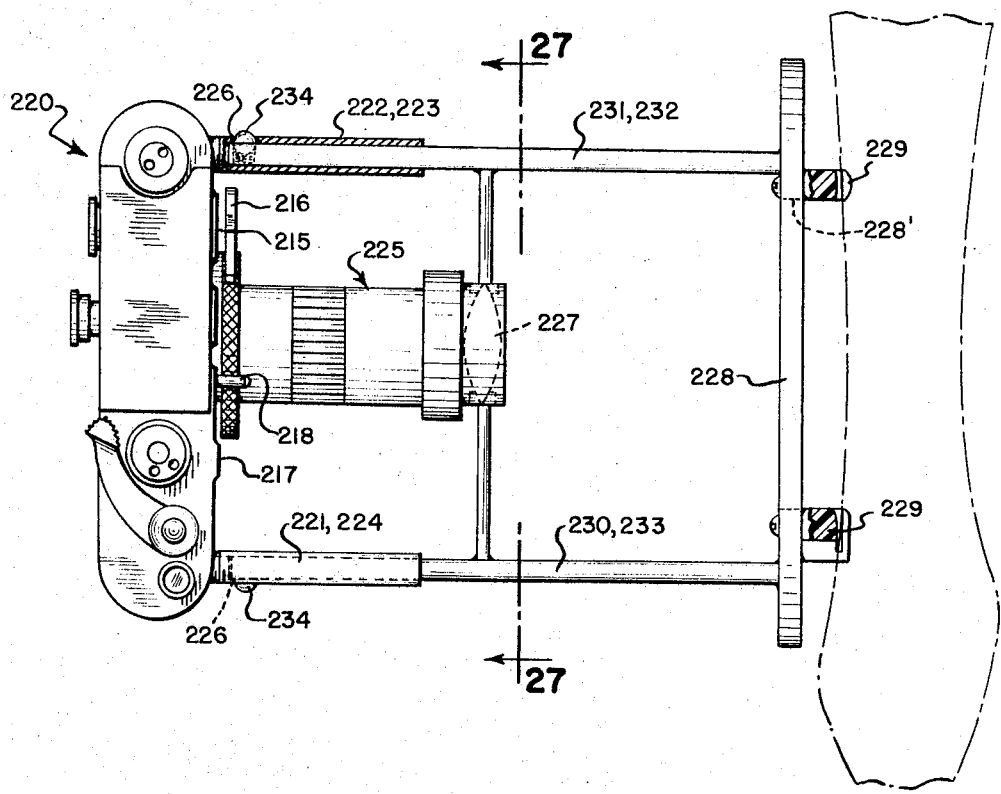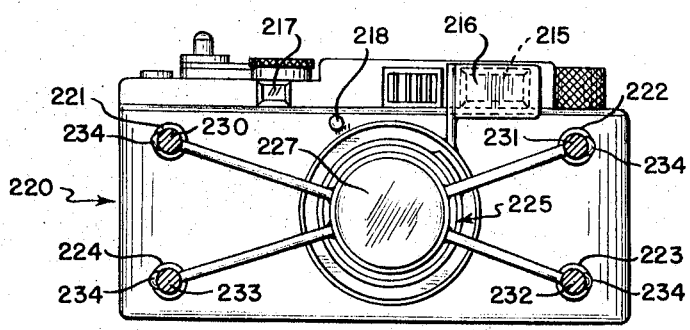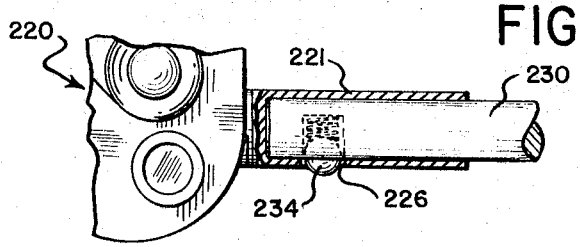

United States Patent Office 3,298,294
Patented Jan. 17, 1967

3,298,294
CAMERA APPARATUS ESPECIALLY ADAPTED FOR THE PHOTOGRAPHIC IDENTIFICATION OF HORSES
James J. Manning, 98 Elder Ave., Floral Park, Long Island, N.Y. 11001
Filed Oct. 27, 1964, Ser. No. 407,624
17 Claims. (Cl. 95—11)

This application is a continuation-in-part of my copending application, Serial No. 291,135, filed June 27, 1963, and now abandoned, for Camera Apparatus Especially Adapted for the Photographic Identification of Horses.

The invention of this application relates generally to a photographic apparatus and specifically to improvements in apparatus for photographing horses in connection with a horse identification system.

The present invention presents certain improvements over the photographic apparatus of my previous U.S. Patent No. 2,866,395. In that patent, a horse identification system was disclosed generally which was based upon the photographing of small growths called chestnuts which appear at the inside of each leg of the horse, slightly above the knee. After the horse is about one year old, the growths or chestnuts remain unchanged in size and shape and have characteristic patterns such as arcs, peaks, points, and plateaus, analogous to loops, arches, and whorls, which are the design units of the human fingerprint system.

As one aspect of the present application, I have disclosed herein a specific grouping of distinctive shapes which my experimental studies have shown may constitute standard design patterns for classifying chestnuts when identifying an individual animal. The design groupings included herein have been used successfully in categorizing several thousands of thoroughbred racing horses and the results of this preliminary work have shown that no two animals wil have identical chestnut configurations.

In the system I have developed, the four chestnuts of a horse are photographed at exactly one-third actual size. The photographs thus taken are enlarged to precise normal size and grouped together upon a composite photograph. On this same composite, photographs of the horse in front and profile views also appear with a photograph of an identification card containing such information as the name of the horse, its sex, color and distinguishing body marks. After the identification card is prepared, a photograph is taken thereof at one-third actual size by means of the same apparatus used in photographing the chestnuts of the horse. This original photograph of the identification card is then enlarged three times in the same apparatus used in enlarging the chestnut photographs. The card includes a line or other object of known dimensions, and in the completed composite photograph the image of this line or object may be measured to determine if its dimensions are the same as those of the known line or object on the actual card. If such is the case, then it is assured that the chestnut photographs, as they appear in the composite, are accurate, actual-size representations of the chestnuts of the horse. This follows, since the identification card and the chestnuts are photographed, and then reproduced, by the same apparatus and with the same procedures. Moreover, this arrangement assures complete standarization of all records, so that records prepared at one track or location are standardized with respect to records prepared at different locations with different equipment.

From the actual-size photographs, appearing in the composite photographic records, the chestnuts of the horse may be studied and classified according to their characteristic features. In this respect, I have developed a classification system which includes twenty-six separate shape classifications. Each such classification may be designated by a letter of the alphabet, and the identification record of the horse will include a description of its chestnuts by such a letter. In addition, one of the characteristic features of a chestnut is its size, and this is readily determined in my system by measuring the planar area of the chestnut from the actual-size photograph, using an ordinary planimeter. Each chestnut may therefore be further described by a number representing area units, as determined by the planimeter measurements. Thus, in the identification record, each chestnut of the horse is described by a letter and a number.

The effective operation of an identification system of the type described, for large-scale operations such as parimutuel racing, depends largely on the ability to take the necessary chestnut photographs quickly and accurately. The photographs must be taken rapidly, often under adverse lighting conditions, and in such manner as not to disturb or frighten a high-strung horse. Moreover, it is necessary that the camera be accurately positioned before taking the photograph in order to insure that the exact desired reduction in size is effected when the photograph is taken.

The present invention provides a photographic apparatus presenting certain improvements over the photographic apparatus disclosed in my aforementioned U.S. patent. In the previous construction, a camera was mounted in a frame structure having means for securing the proper positioning of the camera with respect to the leg of the horse so that a photograph may be taken in the prescribed manner. The frame previously devised was fixed in relation to the camera and was suitable for photographing the chestnuts upon the legs of the horse.

According to the teachings of the present invention, the close up photographing of the chestnut areas of the horse and the additional distant photographs of the horse from the side and front positions may be effected with one camera and on a single strip of film with no confusions as to the proper setting of the camera for each type of photograph being taken.

In one embodiment of the present invention there is provided a mounting frame for a camera including means for photographing a chestnut area of a race horse and additionally means permitting the interchange of lenses on the camera simuleaneously with the effective temporary removal from the field of view of masking frame portions used during the chestnut photography to permit the operator of the camera to take additional photographs of the entire race horse from side and front positions. The arrangement is such that with the frame in position for short distance chestnut photography, it is impossible to operate the camera for the greater distance photography necessary to film the entire horse and vice versa so that even a relatively unskilled person may correctly obtain upon a single film strip a sequence of photographs which later may be printed as a composite photograph identifying each race horse.

According to another embodiment of the present invention, a camera having a single adjustable lens is provided. To this camera, a frame is removably attached so as to extend outwardly from the lens a predetermined distance. This frame is provided with an additional lens adapted to cooperate with the camera lens; and for attaching the frame to the camera, means are provided for automatically adjusting the camera lens to the proper position whereby the close up photography of the chestnuts may be accomplished without confusion. In this embodiment of the present invention, it is also impossible to operate the camera for distant photography when the frame has been attached. When the frame is removed, however, adjustment of the camera lens for distant photography is possible. Thus as with the first embodiment of the present invention, a relatively unskilled person may correctly obtain a series of photographs including both close-up and distant shots upon a single film strip.

As a further aspect of the invention, improvements in photographic enlarging apparatus have been made for assuring the precise photographic printing of the actual size and shape of the distinctive chestnuts. The printing of a composite photograph is illustrated and described wherein all of the pertinent information relating to a particular race horse is printed in a specific sequence taken from a unitary film strip which the camera apparatus of the invention is able to provide. The improvements therefore make virtually impossible any confusion respecting the photographs when taken and the identification of the animal or successive animals which are photographed.

In the following description reference is made, by way of non-limiting examples to forms of construction of photographic apparatus to be used in connection with identification of race horses devised in accordance with the invention and illustrated in the accompanying drawing in which:

FIGS. 1–3 are side, front and top views respectively of a camera in combination with a novel frame apparatus of the invention;

FIG. 4 is a view taken in the direction of arrows 4—4 of FIG. 1 wherein the camera is conditioned to the appropriate short distance lens for photographing a chestnut area;

FIG. 5 illustrates the movement of the lens carriage at an intermediate position;

FIG. 10 shows a representative identification card containing information serving to identfy a particular race horse;

FIG. 11 is a composite card comprising a print made from a sequence of photographs taken by the apparatus of FIGS. 1—9;

Figure 12:
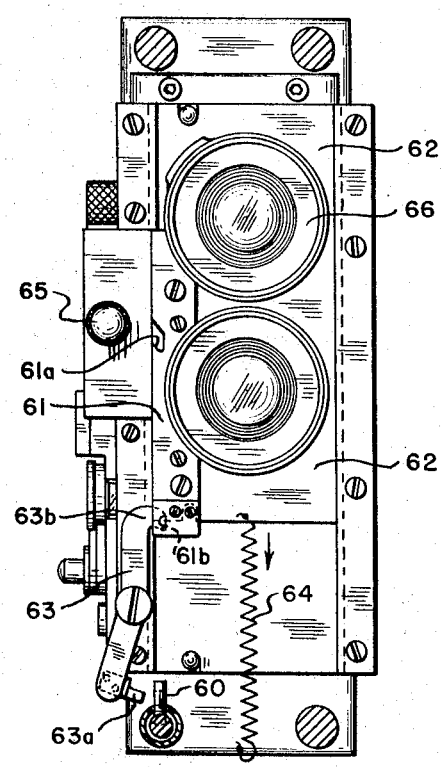
Figure 13:
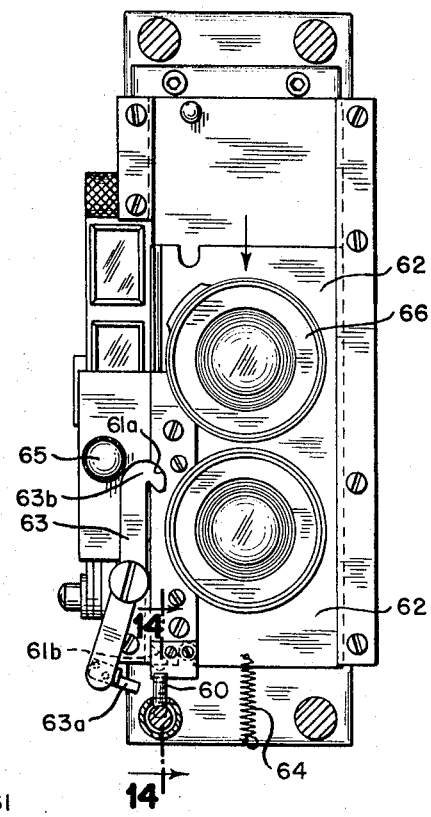
Figure 14:
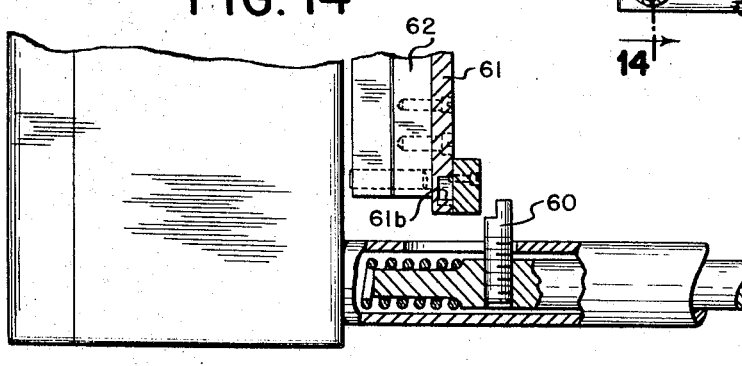
Figure 15:
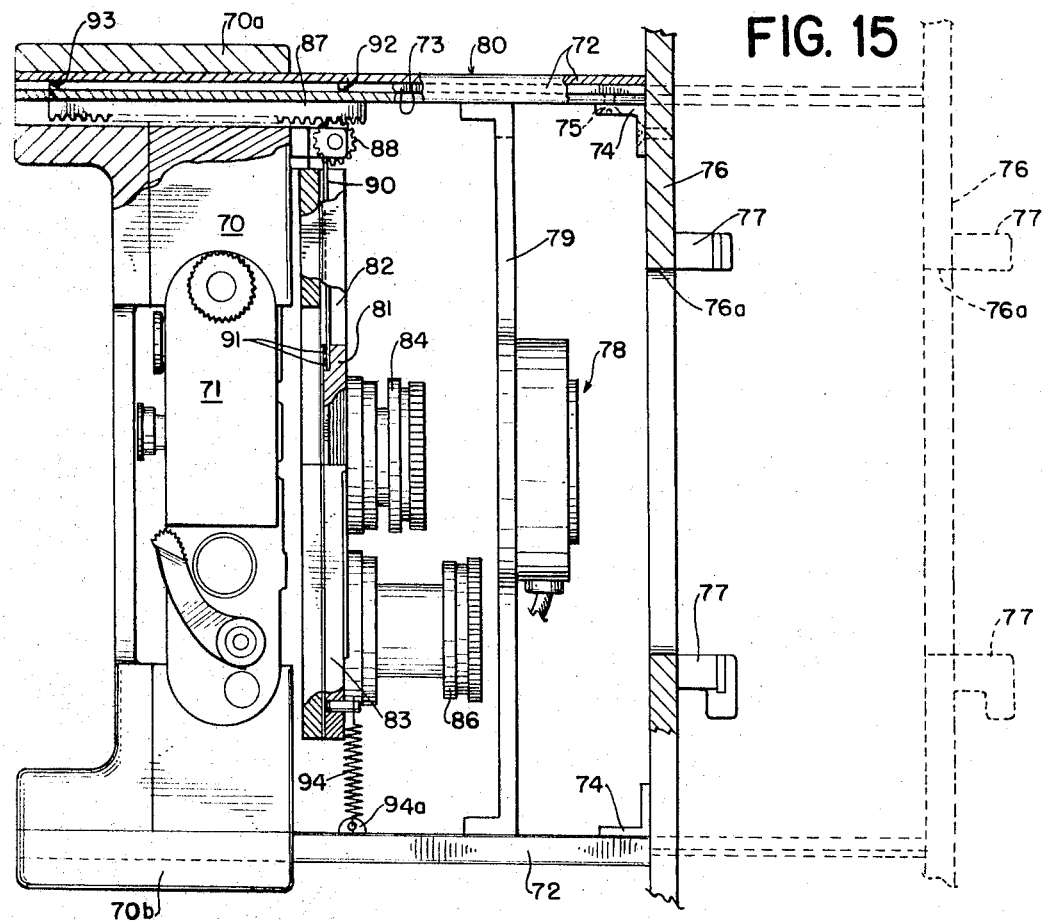
Figure 16:
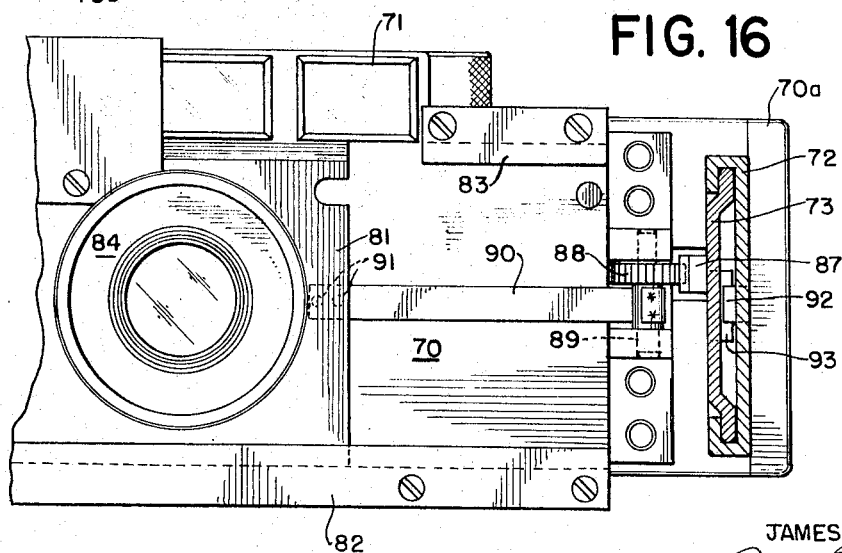

FIGS. 12–14 present a modification of the embodiment illustrated in FIGS. 1–9;

FIGS. 15 and 16 are respectively side and partial front elevations of yet another embodiment according to the present invention;

FIGS. 17 and 18 illustrate representative positions of a photographic enlarger used in producing the composite print shown in FIG. 11;

FIGS. 19–21 are of detailed structure for assuring the accurate positioning of the enlarging apparatus of FIGS. 18 and 19;

FIG. 22 is a detail showing a multi-aperture easel used in connection with the enlarging apparatus to produce the composite photograph of FIG. 11;

FIG. 23 illustrates a chart for classifying the identifying growths or chestnuts of a horse according to shape;

FIG. 24 is a top view of a modified embodiment of the present invention;

FIG. 25 is a front view of the embodiment show in FIG. 24;

FIG. 26 is a top view partly in cross-section of another embodiment of the present invention, FIG. 27 is a view along lines 27–27 of FIG. 26;

FIG. 28 is a front view of the camera shown in FIG. 24 set for taking distant photographs; and FIG. 29 is an enlarged cross-sectional view of the locking mechanism shown in FIG. 26.

Figure 1:
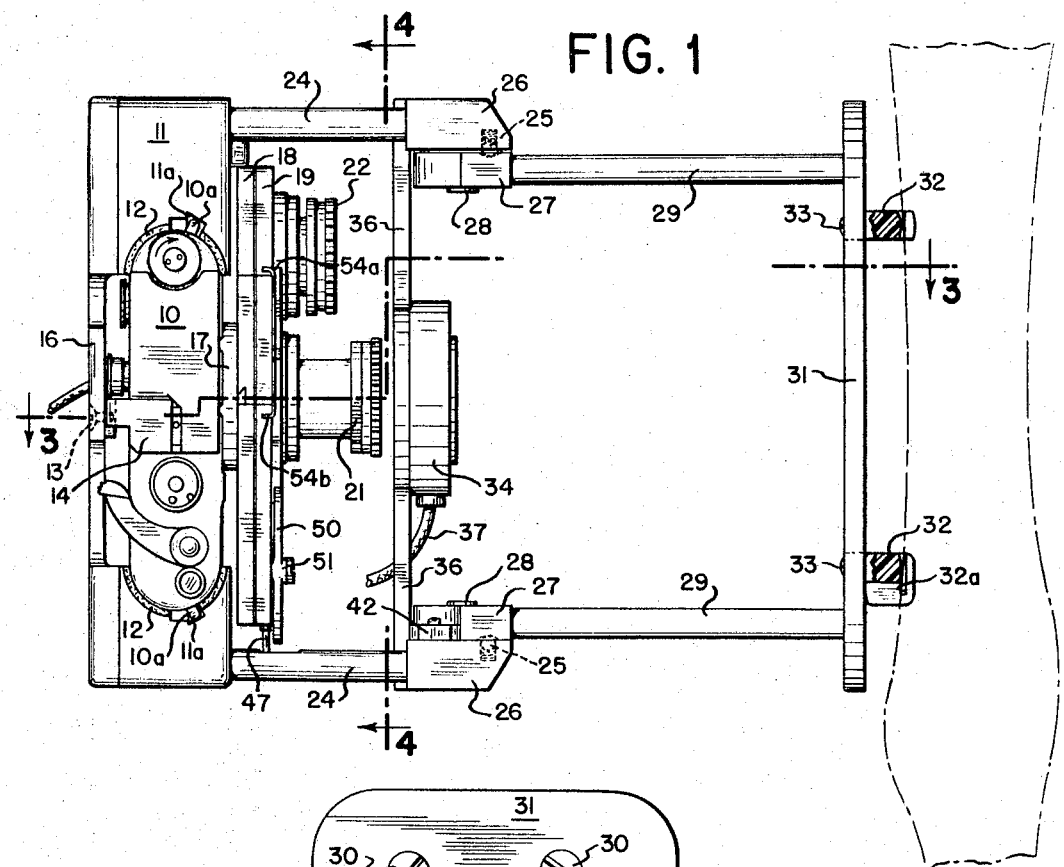
Figure 2:
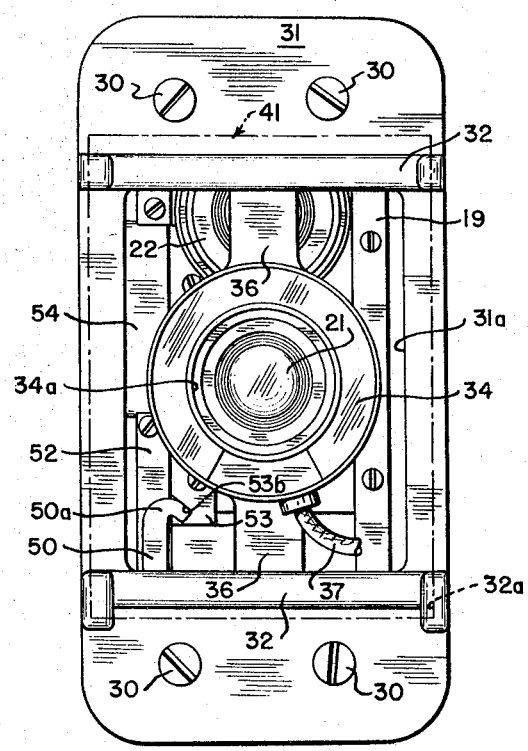

Referring now to the drawing and initially to FIGS. 1–3 thereof, reference numeral 10 designates a camera which in the particular embodiment is a "Leica" 35 mm. model M–1, M–2 or M–3. The camera 10 is held by and fits within a rectangular shaped frame 11 provided with grooves 11a which slidably receive pins 10-a connected to the camera body. As seen in FIG. 1, the camera is fitted closely by the frame 11 about arcuate end portions thereof and intermediate the frame and camera, cushioning means such as felt strips 12 have been affixed to the frame.

The camera 10 may therefore be slidably positioned in a lateral direction with respect to the illustrated position shown in FIG. 3 until the camera bottoms within the recess provided in the frame. The camera is then secured rigidly by means of a screw 13 which interconnects a bracket 14 and a back plate 16 affixed to the body of the frame 11.

As best seen in FIG. 3, the camera 10 is provided with a forward mounting plate 17. The latter is in turn secured to a combination spacer guide 18 by means of attach screws and the spacer guide 18 mounts rails 19 which extend lengthwise of the body of the camera. A lens carriage 20 is held between inwardly diverging longitudinal edge portions of the rails 19 and against the spacer guide 18 for slidable movement with respect to these members. The carriage 20 carries and is rigidly connected to two lenses 21, 22 and their respective mounts, the former being for close-up photography and the latter for distance photography as will be explained in greater detail. By shifting the carriage 20, either of the two lenses 21, 22 may be brought into precise alignment with the photographic axis; however, the movement of the carriage 20 must occur in conjunction with movements of other portions of the apparatus of the invention in order to assure that the proper lens is at all times in position when a photograph is taken either at short range or at a distance.

Accordingly, as may be seen in FIGS. 1–3, the frame 11 is affixed to four posts 24 which at their ends carry hinge halves 26. Mating hinge halves 27 are joined to the halves 26 by means of pivot pin connections 28. The hinge halves are secured releasably in the position shown by ball detents 25. The hinge halves 27 further support and are rigidly connected to four tabular spacing bars 29 which at their ends opposite the hinge halves 27 are connected by screws 30 to a masking plate 31. The masking plate 31 is connected to bumpers 32 made of hard rubber or plastic by screws 33.

As shown in FIG. 2, the plate 31 has a large rectangular opening 31a which is centered about the focal axis of the camera 10 and serves to define a predetermined view area for short distance photography for which a film exposure may be made. The plate 31 thus, functions as a mask affording a limited exposure area at the front of the apparatus.

The bumpers 32 are mounted immediately above and below the exposure opening 31a in the plate 31 and extend transversely with respect to the plate. Since bumpers 32 are made of plastic or hard rubber, when the bumpers are placed against the leg of a horse as shown in FIG. 1, the horse is electrically insulated from the camera apparatus.

For short distance photography with the lens holder 21 aligned with the focal axis is illustrated in FIG. 1, and with the spacer arms 29 extended to position the bumpers 32 immediately adjacent to the leg of a horse, the relationship of the distance from the horse's leg to the focal plane will produce (using a predetermined short distance lens) a photograph of a chestnut which is reduced exactly one-third in size.

For this purpose, I have found suitable for the lens 21, to use a 50 mm. (Elmar close-up lens) with the camera and lens assembly of the suggested make and model focused at infinity at a nominal focal distance of 67 mm. between its focal plane and the plane of the film. Accordingly, in order to photograph an object lying in the plane defined by the front surfaces of bumpers 32 in an exact 3 to 1 reduction ratio, the distance from such plane to the focal plane of the camera assembly must be exactly three times the distance from the focal plane to the plane of the film within the camera. The parts are thus proportioned in such a manner that the focal plane of the camera assembly is 201 mm. from the plane defined by the front surfaces of the bumpers 32.

In order effectively to photograph the chestnuts of a horse, the photographs must be taken quickly, and in many cases under poor lighting conditions. Accordingly, the present camera apparatus includes a light source 34. The light source 34 has a circular lighting element which is attached to mounting struts 36 which extend intermediate and are rigidly affixed to the hinge halves 26. The light source 34 defines a circular central opening 34a which is concentric with the focal axis and through which either of the lenses 21, 22 may operate without obstruction. The light source 34 will be energized through the connecting lead 37 by a battery powered discharge condenser source (not shown). For convenience and portability, the power source may be attached securely to the frame 11 by suitable means. As is well known, during priods of non-use of the apparatus, the condensers of the power source become charged, and when the camera is tripped, the condensers are discharged through suitable coils coupled with the light source 34 to energize the latter. It will be understood that charges of as much as several thousand volts are developed by the condenser discharge power source and therefore, the electrical insulation of the apparatus by means of bumpers 32 from the leg of the horse during periods of photography is of great importance. Furthermore, the positioning of the light source 34 is such that when the equipment is held closely adjacent to the hourse's leg, the flash from the light source 34 which accompanies tripping the camera, has been found not to alarm the horse.

In order better to understand the integration of the present improved apparatus and the identification system used in conjunction therewith, reference is made to FIG. 11 which illustrates as a composite photographic print, the end result of a series of photographs which may be taken by the present apparatus. As shown, the composite photograph 40 may be printed from a series of photographs taken in the enumerated sequence 1 through 7. The manner in which the composite print 40 is made from the film strip will be described hereinafter in greater detail.

It will be seen that item 1 appearing in the lower left of the composite print 40 is a reproduction of a card 41 (see FIG. 10) bearing certain distinguishing information such as the name of the horse, its sex, color, leg and body marks, etc. Furthermore, the card 41 contains a space for the chestnut classification or designation which will be assigned to the chestnuts of the particular horse in acocrdance with the categorizing system herein disclosed. The card 41, as shown in the composite print 40 appears as the first item to be printed upon the composite print and consequently, the card 41 will be the first photograph taken by the apparatus shown in FIG. 1.

With reference to FIG. 2, the card 41 will be seen in dotted outline with the edges thereof secured in slots 32a provided within edge portions of the bumpers 32. The card 41 is thus positioned exactly in the focal plane defined by the outer edges of the bumpers 32 and may be photographed using the close-up lens 21 at a 3 to 1 reduction in size. After the card 41 has been photographed, successive photographs each of the chestnut area upon the legs of the horse are taken, as numerically indicated on the composite photograph 40. Thus, the sequence is to take photographs of the left foreleg, the left hind leg, the right hind leg and finally, the right foreleg. These five photographs conclude the close-up photography and the apparatus of FIG. 1 will then next be used to provide the distance photograph items 6 and 7 of the composite photograph 40 as follows.

Figure 7:
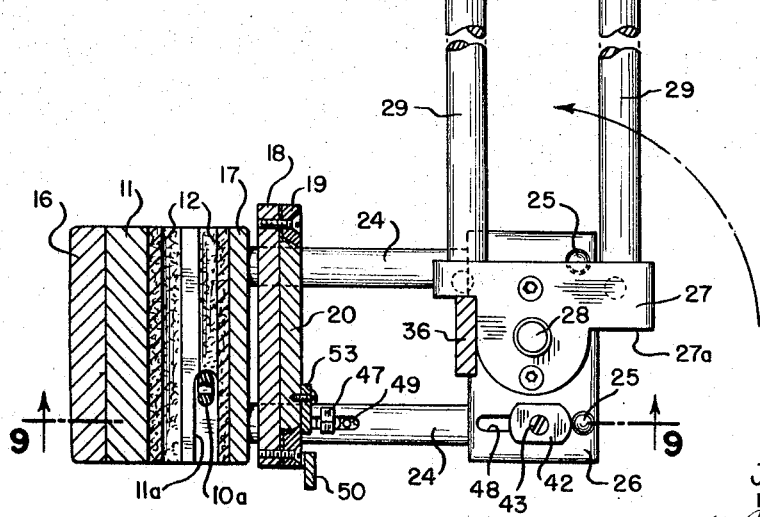
FIG. 7 is an alternate view of the apparatus of FIG. 6.
Figure 8:
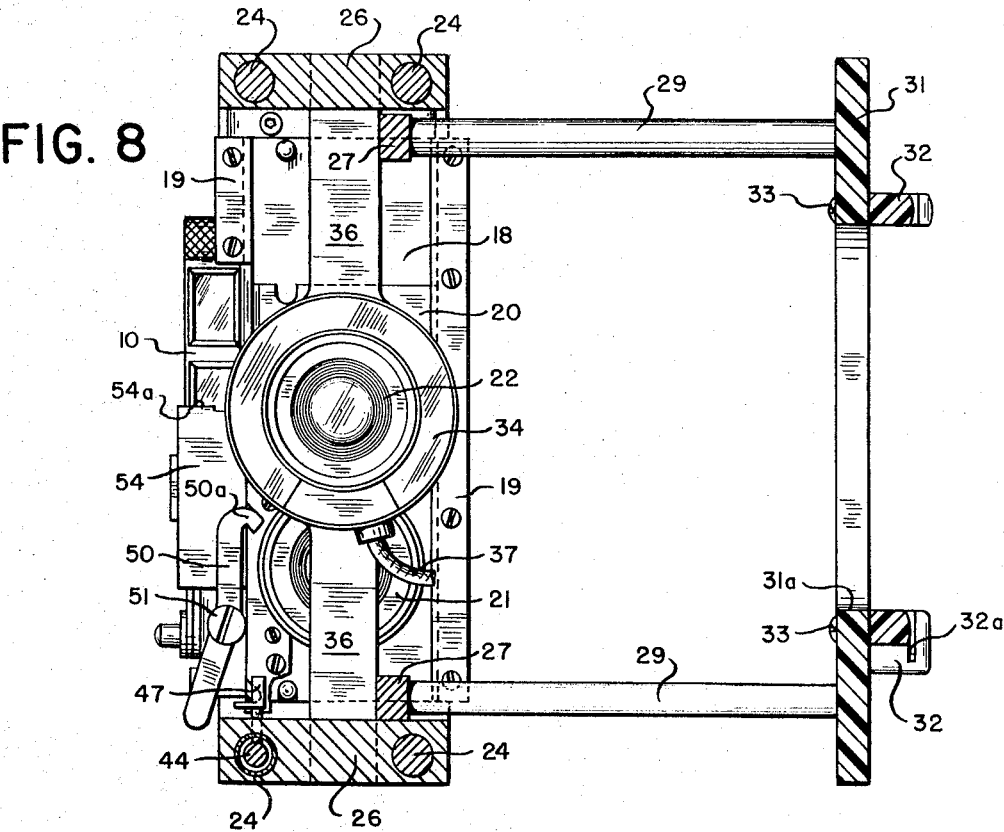
FIG. 8 is a view taken in the direction of arrows 8—8 of FIG. 6.
Figure 9:
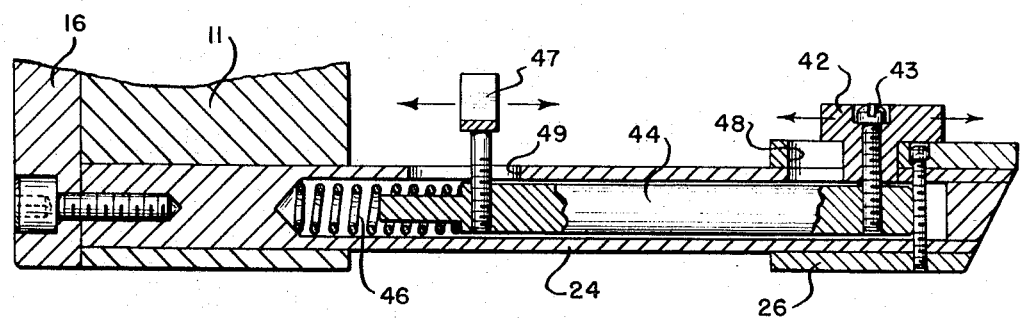
FIG. 9 is an enlarged cross-sectional view taken in the direction of arrows 9—9 of FIG. 7.

As seen with reference particularly to FIGS. 3 and 7, the spacer elements 29 and masking plate 31 may be swung about the pivot pins 28 from the position of FIG. 3 to the position of FIG. 7. This will be done preceding the taking of the distance photographs of the race horse indicated as items 6 and 7 upon the composite photograph 40 of FIG. 11. However, in order to condition the camera for distance photography, it is necessary to move the lens carriage 20 to align the distance lens 22 with the focal axis and the present invention provides for cooperative movement between the pivoting action of the mask away from and out of the field of view and the sliding movement of the carriage 20. Thus, as seen in FIG. 3, the hinge half 27 abuts a cam 42 when the spacer arms 29 are in the position of FIG. 3. As seen in FIG. 9, the cam 42 is attached by a connecting machine screw 43 with a plunger 44 housed internally of the adjacent arm 24. The plunger 44 is spring-biased toward the right as viewed in FIG. 9 by a compression spring 46. Furthermore, the plunger 44 is connected to a plunger pin 47 and the cam 42 and plunger pin 47 are both permitted to move in the direction indicated by the arrows within respective grooves 48, 49.

Therefore, when the spacer arms 29 and hinge halves 27 are in the position of FIGS. 1 and 3, the lower hinge half 27 will urge the cam 42 and plunger 44 toward the left. In this position, the plunger pin 47 will be brought into alignment with the lens carriage 20 to prevent bottoming movement of the lens carriage.

A latch 50 pivotally mounted at 51 to a bracket 52 secured to the frame 11, has a hooked end portion 50a adapted to engage within one of two slots 53a, 53b within a plate 53 which is secured to the lens carriage 20. The latch 50 is spring-loaded to urge the end 50a thereof against the plate 53 so that when the end 50a is immediately adjacent to either of the grooves 53a or 53b, the end 50a will fall within such groove. In the position of the slide carriage 20 illustrated in FIG. 4, the close-up lens 21 is aligned axially with the focal axis and this would be the position of the various parts for close-up photography.

Thereafter, in preparation for distance photography, the operator will first depress the latch 50 to remove the end 50a from the groove 53b. Thereupon, the operator may move the slide carriage 20 toward its lower position as indicated in FIG. 5 by means of the extension 54 which has been provided with overturned end edges 54a, 54b for this purpose. Furthermore, when the slide carriage 20 has been freed by removal of the latch 50 from the groove 53b, a tension spring 56 will urge the slide carriage 20 in the correct direction with or without the assistance of the operator. As the carriage 20 proceeds toward its lowermost position, as illustrated in FIG. 5, the lower end of the plate 53 which is affixed to the carriage will abut the plunger pin 47 and no further carriage movement in this direction is possible until the plunger pin 47 has been moved.

Figure 6:
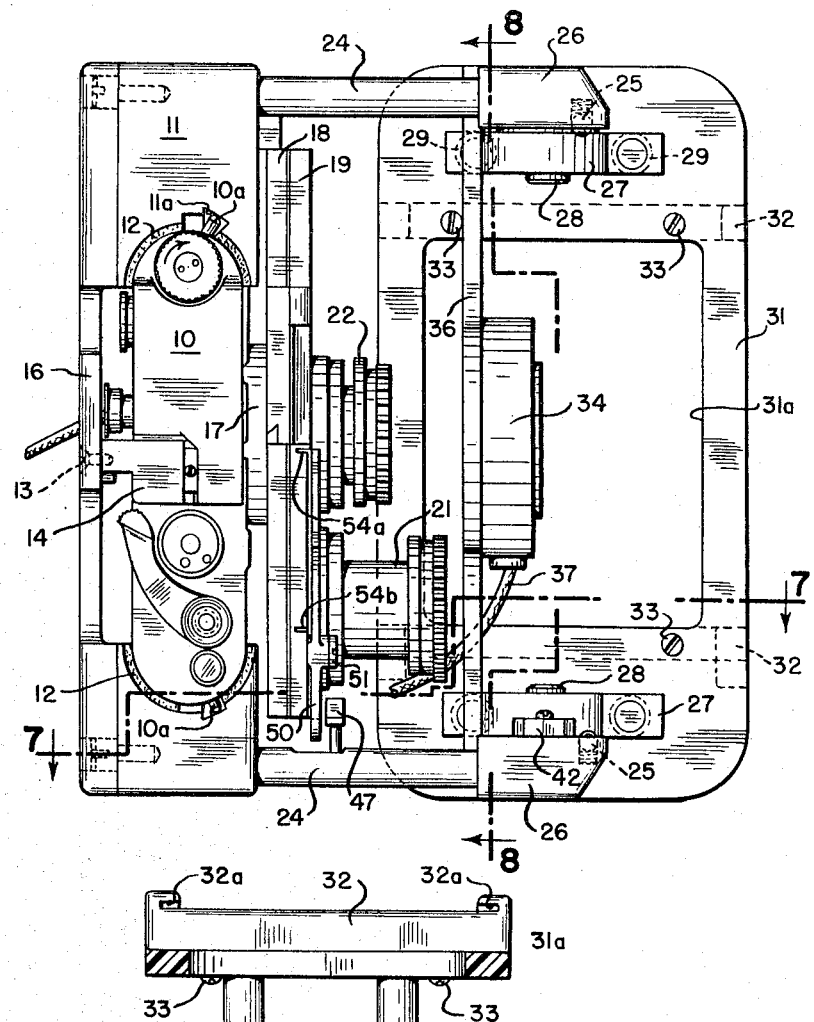
FIG. 6 illustrates the lens carriage and the position of the movable frame elements in position for distance photography.

Removal of the plunger pin from its interfering relationship with respect to the slide carriage 20 is effected by swinging movement of the spacer arms 29 and the hinge halves 27 about the pivot pins 28 into the position of FIGS. 6 and 7. As shown, a shoulder portion 27a of the lower hinge half 27 will no longer abut the cam 42 and the latter together with the plunger 44 may thus travel toward the right due to the urging of the spring 46. At the same time, the plunger pin 47 will be carried toward the right out of interfering relationship with the plate 53 attached to the lens carriage 20. Thus, the movement of the masking plate 31 out of the field of view permits final movement of the lens carriage 20 to the position shown in FIG. 6 wherein the distance lens 22 is aligned with the focal axis. The operator of the camera may then successfully take the distance photographs of the entire race horse as indicated items 6 and 7 of the composite photograph 40.

The apparatus of FIGS. 12–14 presents a modification of the foregoing embodiment. In the modification, a plunger pin 60 is adapted to be aligned with the lower end of a plate 61 secured to a lens carriage 62 when the masking plate (not shown) is in position for close-up photography. The parts are generally of the same construction as illustrated in the previous embodiment but in the modification, a latch 63 has been equipped with a stop pin 63a at the end thereof opposite to the hooked or detent end 63b. The detent end 63b, as in the previous embodiment, is adapted to fit within grooves 61a, 61b within the plate 61 which represent indexing points for the two terminal positions of the slide carriage. The stop pin 63a will interfere with the plunger pin 60 when the plunger pin is in its leftward position which occurs when the masking plate is extended within the field of view. However, upon swinging the masking plate to one side, the plunger pin 60 is urged toward the right as shown in FIG. 14 out of possible contact with the stop pin 63a of the latch 63 and consequently, the latch 63 may be rotated to remove the detent end 63b from the groove 61b. A spring 64 singly or in conjunction with the operator's movement of the lens carriage by grasping a knob 65 connected to a portion thereof, may then urge the carriage 62 to the terminal position shown in FIG. 13. In the latter position, the detent end 63b will automatically fall within the upper groove 61a to secure the slide carriage in the position where the distance lens 66 is aligned with the focal axis.

According to a further embodiment of the invention as illustrated in FIGS. 15 and 16, a rectangular frame 70 is adapted to hold a camera 71 in much the same fashion as disclosed in the previous embodiments. The frame 70 is provided with upper and lower extensions 70a, 70b which house telescoping members 72 and 73. The member 73 is connected by angle members 74, 74' and attach screws 75 to a masking plate 76 which is constructed the same as and performs the same function as the masking plates of the previous embodiment.

Accordingly, the masking plate has a rectangular-shaped opening 76a therein whose periphery adjoins the bumpers 77 such that when the member 73 is extended from the outer C-shaped telescoping member 72 to the dotted-line position, the apparatus will be in position for close-up photography of the chestnuts on a horse's leg. The light source 78 is attached to a strut 79 which bridges across and is connected to a sleeve 80 which surrounds the relatively telescoping members 72, 73 when the parts are in the full-line position.

The camera 71 includes a lens carriage 81 carried by rails 82, 83 which permit slidable movement of the carriage from the position shown in the figures wherein a distance lens 84 is aligned along the focal axis to a position (not shown) wherein a close-up lens 86 will be aligned along the focal axis.

The upper inner telescoping member 73 carries a rack 87 which engages a pinion 88 for rotation of the latter when the masking plate 76 and member 73 move into the outwardly extended or inwardly retracted positions. As seen in FIG. 16, the pinion 88 is journalled by means of a shaft 89 within the end of the frame 70 adjacent to the rails 82, 83. The shaft 89 is connected to a flexible steel tape 90 at one end thereof while the opposite end of the tape is connected to the lens carriage 81 by rivets 91. The arrangement is such that when the member 73 is extended to the dotted-line position for close-up photography, the rack 87 will rotate the pinion 88 and thus the shaft 89 to wind up the tape 90, thereby drawing the carriage 81 to its uppermost position. When the masking plate 76 and telescoping member 73 have reached the full outward extent of travel, the close-up lens 86 will be in fully aligned position along the focal axis. Cooperating fixed and movable tabs 92, 93 respectively on the members 72 and 73 prevent outward movement of the member 73 beyond the correct distance for close-up photography and furthermore, define the terminal position of the parts for close-up photography.

After the photographs of the chestnuts have been completed, the operator will then merely push the masking plate 76 toward the frame 70 to retract the member 73 within the member 72 which thereby causes reverse rotation of the pinion 88 and unreeling of the tape 90. The opposite end of the lens carriage 81 is connected to a spring 94 anchored to the frame at 94a which automatically urges the carriage 81 to the position shown in the figures. When the masking plate is in its full-line position, the opening 76a therein is sufficiently wide effectively to remove the masking plate from the field of view so that distance photographs of the race horse may be then taken.

A further embodiment of the present invention is illustrated in FIGS. 24 and 25. In this embodiment a camera 200 is provided with a single adjustable lens 201 such as a 50 mm. telescopic lens. Unlike lens 21 of FIG. 1, lens 200 is mounted directly to the camera rather than through any carriage member. Accordingly, the focal distance of the camera and lens assembly 200, 201 focused at infinity, is 50 mm. rather than 67 mm. The lens 201 is adjustable between two settings, that required for the close-up photography of the chestnuts and that required for taking the distant side and front view pictures of the horse.

For taking the close-up pictures, the lens, when viewed from the front of the camera, is rotated clockwise and as conventional, this will cause the lens housing 202 to collapse until the focal distance of 50 mm. is established. This position will be found when the lens has been rotated in a clockwise direction to the limit of the operative range of the lens. Of course, lens housing 202 may be of the type that will collapse to a position quite close to the camera face for storage purposes. This further rotative movement and collapsing would be permitted by releasing a latch, not shown; however, during use of the camera, such a latch would be engaged and therefore clockwise rotation of lens 201 and collapsing of the housing 202 will automatically be stopped at the 50 mm. distance.

As shown in FIG. 24, the forward end of housing 202 is provided with a threaded female socket 203 for receiving and releasably holding the spacer structure 204 used in conjunction with the close-up photography.

The spacer structure includes an externally threaded annular member 205, four spacer arms 206–209 connected to the annular member at their rearward ends, and a masking plate 210 connected to the forward ends of the spacer arms, the masking plate 210 is substantially the same as masking plate 31 of FIG. 1 and is provided with a large rectangular opening 211 and forwardly extending bumpers 212.

For photographing the chestnuts when positioned in the plane defined by the front surfaces of the bumpers 212 in an exact 3:1 reduction ratio, a supplementary close-up lens 213 is provided in the annular member 205. This supplementary lens when properly positioned with respect to lens 201 will focus the chestnuts in an exact 3:1 reduction within the limited space available by effectively establishing a 3:1 reduction in the distance from the plane defined by the front surfaces of the bumpers 212 to the focal plane of the lens system 201, 213 and the distance from this focal plane to the plane of the film within the camera.

To assure that these distances are automatically established before the close-up photographs are taken, the threading of the female socket 203 and the annular member 205 are constructed so that when they are fully engaged, lenses 201 and 213 are positioned properly with respect to each other and lens 201 is properly collapsed to the close-up position. To effect this result, the threads of the socket 203 and annular member 205 are made so that rotation of the annular member in a clockwise direction as viewed from the front of the camera 200 will be required to connect the annular member to the socket member. Therefore, since for close-up photography, both lens 201 and the spacer structure 204 must be rotated in the same clockwise direction, the connecting of the spacer structure to the camera by rotating it to its limit of rotative movement relative to the camera will automatically collapse lens 201 to the required extent. In this position the rectangular opening 211 of the masking plate 210 will be in alignment with the rectangular outline of the camera 200.

As shown in FIG. 24, a light source 214 is provided on the spacer structure for standardizing the lighting conditions under which the close-up photography is to be taken so as to produce uniformly exposed pictures.

After the required close-up photographs have been taken and it is desired to take distant photographs of the horse, the spacer structure is removed from the field of view, and the lens system comprising the lens 201 without the supplementary lens 213 is employed.

Once the spacer structure has been removed from the field of view, it is necessary to adjust the lens 201 into proper position from distant photography. This movement is effected by rotating the lens in a counterclockwise direction as viewed from the front of the camera. To assure that the camera lens 201 is properly focused for the distant photographs, an automatic range finder of conventional construction may be provided. Where such an arrangement is used, it is merely necessary to adjust the lens 201 while viewing the horse in the range finding window 215 until a single outline of the horse is shown. At this point, the lens 201 will be properly focused for the distance existing between the horse and position of the operator when making the adjustment.

Alternatively, a stop may be provided whereby the lens may be rotated counterclockwise to a predetermined limit as for example where the horse would be in focus at 18 feet. Where this arrangement is used, the operator after removing the spacer structure, rotates the lens counterclockwise as far as it will go and then steps off 18 feet for taking the distant photographs.

Since in removing the spacer structure, it must be rotated in a counterclockwise direction, such removal will automatically tend to cause the lens to rotate in a counterclockwise direction. To assure that the lens will be rotated to the limit of its counterclockwise movement before the spacer structure is removed, the lens housing is constructed so that it takes less force to rotate it than it does to start rotation of the annular member 205 within the socket member 203.

To further assure that the lens is properly adjusted for distant photographs before the distant pictures of the horse are taken, a blocking arm 216 is attached to the lens housing 202 and adapted to be moved back and forth in the direction indicated by the arrow in FIG. 25 from a first location covering the viewing window 217 to a second location where the window is uncovered. A stop 218 fixed to the camera face is provided for limiting counterclockwise movement of the lens housing 202. This stop is positioned so that when engaged by the arm 216, the lens 201 will be properly focused for taking distant photographs at, for example, 18 feet. If on the other hand, distant focusing of the lens 201 is to be effected by means of a range finder incorporated in the camera 200, the stop 218 will be dispensed with. In taking the close-up pictures of the chestnuts, it is not necessary to use the viewing window to properly position the camera since alignment may be effected by merely positioning the bumpers 212 of the spacer structure against the horse's leg.

In another embodiment of the present invention the bayonet arrangement of FIGS. 24 and 25 may be replaced by a telescopic construction shown in FIGS. 26 and 27. In this embodiment, the camera 220 is provided with four tubular posts 221–224 disposed symmetrically around the lens 225 which is a telescopic zoom lens like that shown in FIG. 24. Each of these posts are provided with a detent opening 226 as shown in FIG. 25.

The spacer structure of this embodiment includes a close-up lens 227, a masking plate 228 having a rectangular opening 228', and bumper elements 229. The plate is adapted to be releasably connected to the camera by means of four male posts 230–233 each of which is provided with a ball detent 234 for cooperating with the detent openings 226 of the tubular members 221–224. The positioning of the detent openings 221–224 and the detent projections 234 are such that when the spacer member is locked in position, the distance between the plane defined by the bumpers of the masking plate and the effective focal plane of the lens system 225, 227 is exactly three times the distance from this focal plane to the plane of the film within the camera. Also, the positioning of the detent openings 221–224 and the detent projections 234 are such that they cannot be moved into cooperation with each other until the lens 225 has been collapsed to the proper position for close-up photography. This is assured by the position of the supplementary close-up lens housing on the spacer structure at such a location whereby it will hit the camera lens housing before the telescopic members are locked together and thereby prevent such locking if the camera lens is not collapsed to the position for taking close-up photographs.

The remaining parts of the embodiment shown in FIGS. 26 and 27 for preventing use of the camera for distant photography unless the lens 225 is properly adjusted is preferably the same as in the embodiment of FIGS. 24 and 25.

FIGS. 17–22 are illustrative of apparatus used in connection with the invention for assuring the precise printing of the composite photograph 40 illustrated in FIG. 11. As mentioned, in accordance with the present arrangement, close-up photographs 1–5 will first be made to a 3 to 1 reduction in size upon the film negative. Since it is a primary purpose of the identification system to be able accurately to identify individual race horses by means of the shape and size of the chestnuts, it is necessary that accuracy in reproducing the photographs of the chestnuts as to shape and area be precisely maintained. It has been found expedient for measurement purposes to reproduce the actual size of the chestnuts and accordingly, a 3 to 1 enlargement of the photographs is necessary. It has further been found that whereas commercial enlarging apparatus contains generally means for assisting an operator to set the enlargement at a predetermined ratio, for purposes of the present identification system, such settings are not precise and it has therefore, become necessary to modify the equipment to produce the extreme accuracy required.

As seen in FIGS. 17 and 18, a conventional enlarger 170 is carried upon a stanchion 171 and may be adjusted in height above an easel 172 which accommodates a photographic plate 169. The easel 172 has been described more particularly in my U.S. Patent No. 2,866,395 and includes generally a series of hinged closure members 172a, 172b, etc. altogether seven in number which may be opened in the sequence enumerated progressively to expose portions of the photographic plate lying underneath. The enlarger 170 may be positioned by the operator and a filter 173 will prevent exposure of the photographic plate when one of the hinged closure members is swung open to the positions, for example, illustrated in FIGS. 17 and 18. The operator, therefore, has the opportunity of centering the image projected by the enlarger within the appropriate opening uncovered by one of the closure members of the easel and when such centering has been accomplished, the filter will be removed for the appropriate time interval to effect printing of the image upon the film plate 169 exposed beneath the selected closure member of the easel 172.

As shown in FIG. 11, the composite photograph 40 requires that items 1–5 representing the identifying information upon the card 41 (FIG. 10) and the four chestnut photographs be reproduced first from the unitary film strip produced by the photographic apparatus of the invention. It is necessary, therefore, precisely to position the enlarger 170, in the illustrated position of FIG. 17, to reproduce prints accurately at a 3 to 1 enlargement.

As shown, the enlarger 170 is supported upon the stanchion 171 by a series of pivot arms 174 which are connected at their ends to the enlarger and at opposite ends to a mounting collar 175 secured to the stanchion 171. The collar 175 is shiftable longitudinally of the stanchion 171 and may be secured at intermediate positions with respect thereto by the insertion of a pin 176 in one of a series of spaced longitudinal openings in the stanchion 171. When in this position, the enlarger 170 may be swung toward or away from the easel 172 and may be rotated laterally with respect thereto. A scale 177 is provided which indicates generally the angular relationship between arms 174 and the enlarger carriage to indicate generally the enlargement ratio. However, for the purposes of the present identification system, this indication has been found to be far too crude for accuracy.

As a consequence, it has been necessary to devise an indexing device indicated generally by reference numeral 178 and shown more specifically in FIGS. 19–21. The indexing device 178 comprises a plate 179 which is connected by a pivot 180 to the lower arm 174. Therefore, when the arm 174 rotates about its end pivot 181, the plate 179 will move upwardly or downwardly. The plate 179 includes a groove 179a which receives a stop pin 182. The latter is secured rigidly to the collar 175. Furthermore, the plate 179 carries a generally L-shaped indexing arm 183 with a corresponding L-shaped groove 183a therein. The arm 183 is pivotally connected to the plate 179 by a pin 184.

As seen in FIG. 19, the plate 179 further mounts a leaf finger member 186 which urges the L-shaped arm 183 in a clockwise direction to seat the stop pin 182 in the detent area of the groove 183a at the upper end thereof. The placement of the plate 179 and the pin 182 respectively upon the arm 174 and the collar 175 together with the dimensions of the various parts will be such that with the parts shown in position of FIG. 19, wherein the pin 182 is bottomed in the slot of the groove 183a, the enlarger 170 will be positioned to reproduce a 3 to 1 enlargement upon the photographic plate 169 positioned upon the easel 172. The contour of the groove 183 is such that in conjunction with the spring urging of the leaf spring member 186, the pin 182 will be prevented from moving in the groove 183a thus securing the parts rigidly in the position shown. In order to raise the enlarger to the position of FIG. 18, it is necessary to urge the plate 183 counter-clockwise whereupon the plate 183 may be raised relative to the pin 182 as the enlarger is elevated.

It will be understood that the elevation of the enlarger to the position of FIG. 18 will follow the 3 to 1 enlargement of the photographs numbered 1–5 upon the composite photograph 40, and in this connection, the enlargement of prints 6 and 7 will be approximately 5 to 1. The operator will, however, determine the degree of enlargement required by centering the projected image through the appropriate opening provided by swinging away the correct hinge closure member of the easel.

It has been found that in order to achieve a precise 3 to 1 enlargement ratio when using different easels with a standard enlarger 170, a fine adjustment usually will be required to be made between the grooved arm 183 and the carrying plate 179. As seen in FIG. 20, the arm 183 is connected by screws 187, 188 and the pin 184 to a U-shaped bracket 189 which may ride adjacent to and upon the reverse side of the plate 179. The screws 187, 188 and pin 184 extend through the plate 179 and the bracket 189 may move with the arm 183 upwardly or downwardly for a limited distance as determined by slots 187a, 188a and 184a which receive the corresponding interconnecting screws and pin. When it has been determined that the indexing arm 183 is precisely positioned so that when the pin 182 bottomed therein and will produce an enlargement precisely at a 3 to 1 ratio, the bracket 189 and indexing arm 183 are secured immovably with respect to the plate 179 by the set screw 190.

After photographing and reproduction by the foregoing apparatus, the chestnuts are classified. The classification of the chestnuts in the new universal system of horse identification is based upon their two characteristic variable factors, i.e., their sizes and shapes. The chestnuts have been found to vary from the largest, as big as a man's ear to the smallest as tiny as a mustard seed or none at all. No horse has been observed, to date, with less than two chestnuts. About one horse in five hundred has only three chestnuts. The absence of one or more chestnuts places a horse in a rare classification.

An internal standard has been incorporated to guarantee the size factor of the chestnuts. The identification card 41 contains standard lines which are used to calibrate the fixed focus ratio of both the camera and the enlarger used to photograph and enlarge the chestnuts to their actual sizes on the final identification photograph used by the paddock identifier. A copy of the identification photograph is used for the classification of the chestnuts.

A compensating polar planimeter, reading areas directly in square centimeters, is employed to measure the total area covered by the chestnuts on each leg. The operation of the planimeter is simple and can be mastered by use after 10 to 15 minutes of practice. The tracer of the planimeter is moved completely around the perimeter of the chestnut, starting at a fixed point and returning to the same point on the perimeter. The difference between the first reading on the drum, at the start, and the final reading is the total area in square centimeters covered by the chestnut. If any doubt exists as to the results of the first measurement, then a repeat measurement can be made in a minute or two. The size of the chestnut is stated to the nearest whole number in square centimeters, e.g. 6.3 sq. cm. is reduced to 6 sq. cm. or 7.8 sq. cm. is changed to 8 sq. cm. Each of the four chestnuts are measured in turn from the scaled photograph and the values recorded in the proper quadrant on the identification card 41 corresponding to the four legs of the horse.

The second variable factor of the chestnut which is used in the new universal system of horse identification classification system is the distinctive shapes. After an examination of many thousands of scaled photographs of chestnuts the shape pattern of the chestnuts were found to have an almost infinite variety of shape patterns. The cracks and marks on the surface of the chestnuts are of no value in the classification system due to the fact that the chestnuts shed and grow outward from the skin. However, the distinctive shape of a chestnut has been found to remain permanent during life, after the first 18 months of growth on the young horse. Scaled photographs taken of the same chestnuts year after year show no change in the size or shape pattern.

An exhaustive and experimental study of the shape patterns of many thousands of chestnuts suggested a system of classification based upon four basic units of shape. These units are (A) the point (∧), (B) the peak (∩), (C) the arc (⌒), and (D) the flat (———). The actual size of these basic units are entirely arbitrary; they are generalized shapes similar to the loops and whorls in fingerprint classification. The chestnut shape patterns were found to fall into groups having one or two peaks or points or groups of both a peak and a flat, etc. The part of the chestnut which varied most from one horse to another horse was the topmost part of the chestnut. A series of generalized shape patterns based upon the basic units described above were formulated.

Additional subdivisions of the more frequently appearing shape patterns were devised by co-relating the size and shape characteristics into subdivisional classes. The maximum lengths and widths are used to make these subdivisional classifications. A transparent six-inch ruler is all that is needed to check the ratios of the maximum lengths and widths on the scaled photograph while classifying the chestnuts. A set of simple rules has been devised to assist the classifier in his determination of the shape pattern classifications and the subdivisional classes. The rules are listed following this prefatory description.

A chart (see FIG. 23) has been drawn up of these generalized shape patterns with a designated code letter (A) to (X) for each of the twenty-four patterns. Another code letter (Y) is used for the unique classification, which is to be used for very unusual shape patterns. The final letter (Z) is used for the absence of a chestnut on a leg.

A classifier can classify the four chestnuts from the scaled photograph, using the planimeter and the shape pattern chart in five to ten minutes. The entire identification classification of a race horse such as color, sex, age, body marks, chestnut classification, etc., can be coded and recorded in approximately 15 to 20 minutes, depending on the system selected.

Referring now to FIG. 23 and the classification chart thereof, the system of chestnut classification devised in accordance with the present invention will be described.

The two regions of the chestnut used in this classification are the top and the bottom of the chestnut. The length and width of the larger chestnuts are used to subdivide the more numerous occurring shape patterns.

The basic units of the chestnut classification system are general shapes which are called (I) the point ($\wedge$), (II) the peak ($\cap$), (III) the arc ($\frown$) and (IV) the flat (———). These basic general units are similar to the whorls, loops, etc., in human fingerprints.

The most frequently occurring shape patterns have been found to be the (B) and (C) pattern with the (B) class the most frequent. The (B) and (C) patterns are subdivided into (A) pattern if the following condition is found (L>3W). The letter (L) is the maximum length and the letter (W) is the maximum width of the chestnut. The rule is that "class (B) or (C) are classified as class (A) if the length is greater than three times the width." These distances are readily estimated by a transparent plastic ruler placed on the chestnut in the photograph.

Classes (E), (F) and (G) are the reverse of classes (C), (B) and (A) respectively. The same rule applies as for (A), (B) and (C), i.e. (L>3W), (E) or (F) become (G).

Classes (D) and (H) are for chestnuts with shape patterns with similar top and bottom shapes whether they be points, peaks or arcs. The class (D) is made up of the chestnuts which fit the rule (L>2W) "the length is greater than twice the width, measured at the middle." The remaining chestnuts with similar tops and bottoms are class (H).

The same rule (L>2W), "the length is greater than twice the width, measured at the middle" is employed to subdivide the larger chestnuts from the smaller chestnuts in shape patterns J–K, L–M, N–O, P–Q and R–S.

In these classes above and classes T, U, V and W the shoulder must be at least ¼ the width across at the shelf. In class (I) the flat should be at least 60% of the width. The tilt of the shoulder, away from an imaginary north-south center line must not be greater than 30%. This tilt angle applies to class (I) as well.

Class (X) is reserved for tiny chestnuts with an area less than 1 square centimeter (Area<1 cm.²).

Class (Y) is to be used for all unusually shaped chestnuts. This classification is not meant to be a catch-all class but reserved for shape patterns very rarely encountered.

Class (Z) is reserved for a leg without a chestnut.

The chestnuts are classified as described and their classification code placed on the identification card 41 in the finished composite photograph 40 used by the identifier prior to race time.

The complete data for each race horse may be then stored on punch cards and can be retrieved in a few minutes for any race horse covered by the new system of horse identification.

For use at race tracks, for example, the new camera apparatus may advantageously include a Polaroid Land Camera, or equivalent device capable of providing a finished photograph in a short time, without the use of dark-room facilities. In such cases, the camera and frame are arranged to photograph at a 1:1 ratio, whereby an actual size photograph is provided. This form of the apparatus may be advantageously employed immediately prior to and/or following a race to avoid the possibility of substitution of horses between the stable and paddock or between the paddock and starting gate. Likewise, this apparatus may be used to prevent substitution of horses after a race, before the usual tests are made to determine whether a horse has been drugged. In any instance where there is reason to suspect the substitution of horses, and actual-size photograph of one or more chestnuts may be taken on the spot and compared with the official track records to quickly verify the identity of a horse.

The improved apparatus disclosed herein makes foolproof the taking of a series of photographs first requiring close-up photography (while photographing the chestnuts and identity card) followed by distance photographs of the same race horse upon a single strip of film. The apparatus coordinates the foregoing sequence of operation and assures the correct and cooperative positioning of those portions of the apparatus necessary to effect close-up photography and the shifting of certain masking portions outside of the field of view when accompanied by movement of the distance lens into position along the focal axis.

It will be understood that the foregoing description relates to a particular embodiment or embodiments. In order more fully to understand the spirit and scope of the invention, reference is made to the appended claims in which:

I claim:

1. Photographic apparatus for use in a system for the photographic identification of horses comprising a camera, a frame structure rigidly supporting said camera, said frame structure including a slide carriage, a close-up lens and a distance lens mounted on said carriage, said carriage being slidable with respect to the focal axis of said camera between terminal positions wherein each of said lenses is centered with respect to the focal axis of said camera, means for fixing said carriage in each of said terminal positions and for releasing said carriage for movement from one terminal position to the other, said frame structure further including spacer arms extending forwardly parallel to the focal axis, a masking plate connected to said spacer arms at a predetermined distance from the focal plane of the camera, means including said masking plate and defining at outer edge surfaces thereof a plane set at the correct focal distance from the focal plane of the camera for close-up photography when using said close-up lens, means for moving said masking plate out of the effective field of view of the focal axis during distance photography and means in cooperation with said last mentioned means for moving the slide carriage into the terminal position thereof wherein the distance lens is aligned along the focal axis.

2. Photographic apparatus for use in a system for the photographic identification of horses comprising a camera, a frame structure rigidly supporting said camera, said frame structure including a slide carriage, a close-up lens and a distance lens mounted on said carriage, said carriage being slidable with respect to the focal axis of said camera between terminal positions wherein each of said lenses is centered with respect to the focal axis of said camera, detent means for fixing said carriage in each of said terminal positions and for releasing said carriage for movement from one terminal position to the other, said frame structure further including spacer arms extending forwardly parallel to the focal axis, a masking plate connected to said spacer arms at a predetermined distance from the focal plane of the camera, bumpers connected to said masking plate and defining at outer edge surfaces thereof a plane set at the correct focal distance from the focal plane of the camera for close-up photography when using said close-up lens, means for pivoting said masking plate away from and out of the line of sight of the focal axis, and means in cooperation with said last mentioned means for moving the slide carriage into the terminal position thereof wherein the distance lens is aligned along the focal axis.

3. The photographic apparatus according to claim 2 in which the pivoting means comprises upper and lower hinge halves fixed to sets of said spacer arms outside of the line of sight, one of said spacer arms includes a plunger spring-loaded in a direction toward one hinge half, a cam connected to said plunger for contact with a portion of said one hinge half to shift the plunger toward said lens carriage, a pin connected to said plunger extending therefrom into the path of said carriage when said masking plate is in position for close-up photography, movement of said masking plate to a position out of the line of sight effecting movement of said one hinge half out of contact with said cam whereby the plunger pin is removed from the path of the lens carriage to permit movement of the lens carriage into the terminal position for distance photography.

4. The photographic apparatus according to claim 2 in which the pivoting means comprises upper and lower hinge halves fixed to sets of said spacer arms outside of the line of sight, one of said spacer arms includes a plunger spring-loaded in a direction toward one hinge half, a cam connected to said plunger for contact with a portion of said one hinge half to shift the plunger toward said lens carriage, a detent latch mechanism connected to said frame structure, said latch mechanism having end portions receivable within corresponding detent grooves in said carriage for fixing the terminal positions thereof, a pin connected to said plunger extending therefrom into abutting relation against a portion of said detent latch mechanism to prevent release operation of said mechanism when said masking plate is in a position for close-up photography, movement of said masking plate to a position out of the line of sight effecting movement of said one hinge half out of contact with said cam whereby said plunger pin is removed from abutting relation with said latch mechanism to permit release movement thereof and subsequent movement of the lens carriage into the terminal position for distance photography.

5. The photographic apparatus according to claim 2 in which the bumpers defined slots at their outer edges contiguous to the plane defining the outer edge surfaces thereof, said slots being adapted to receive a card for photographing information thereupon in sequence upon a unitary film strip together with close-up photography of chestnut growths successively upon the four legs of a horse.

6. The photographic apparatus according to claim 2 in which spring means connects the frame structure and slide carriage to effect automatic movement of the slide carriage toward the terminal position for alignment of the distance lens upon the release of the detent means.

7. The photographic apparatus according to claim 2 in which the carriage is mounted to the frame structure by an intermediate guide plate and by rails attached to said guide plate, said carriage being free to slide between the rails to its terminal positions.

8. Photographic apparatus for use in a system for the photographic identification of horses comprising a camera, a frame structure rigidly supporting said camera, said frame structure including a slide carriage, a close-up lens and a distance lens mounted on said carriage, said carriage being slidable with respect to the focal axis of said camera, detent means for fixing said carriage in each of said terminal positions and for releasing said carriage for movement from one terminal position to the other, said frame structure further including telescoping spacer means extendable forward to the focal axis, a masking plate connected to said spacer means and extendable thereby to a predetermined distance from the focal plane of the camera, means including said masking plate and defining at outer edge surfaces thereof a plane set at the correct focal distance from the focal plane of the camera for close-up photography when using said close-up lens, a rack connected to and outwardly movable by one of said telescoping members, a pinion in meshing engagement with said rack, said pinion having a shaft journalled in said frame, a tape connected at one end to said shaft for winding up about said shaft upon rotation of the pinion, the other end of said tape being connected to said lens carriage such that winding up of said tape will cause movement of the lens carriage toward said pinion, one of the close-up and distance lenses of said carriage being arranged with respect to slidable movement of the carriage in accordance with winding up of the tape to effect alignment of said one lens along the focal axis of the camera when the carriage is in a terminal position and the tape is wound upon the pinion shaft, the other of said lenses being in alignment with the focal axis of the camera when the carriage is in the opposite terminal position.

9. The photographic apparatus according to claim 8 in which the lens carriage is spring-loaded to effect movement of the lens carriage to the other of its terminal positions.

10. The photographic apparatus according to claim 2 including a unitary film strip within the camera, said camera is operated successively to take and record upon said film strip a series of close-up photographs and distance photographs, enlargement apparatus for printing from the photographic negative provided by the film strip, an easel located beneath said enlargement apparatus adapted to hold a photographic plate, said easel having a series of hinged closure members for exposing selected portions of the photographic plate when said enlargement apparatus is centered over said portions, means connected to said enlargement apparatus for locating and locking the enlargement apparatus at a precise predetermined enlargement ratio with respect to the spacing of said apparatus from the photographic plate and means for releasing the locking means to permit shifting of the enlargement apparatus to a second position for a different enlargement ratio.

11. The apparatus according to claim 9 in which the enlargement apparatus comprises an enlarger head supported for pivotal movement toward and away from said easel by arms pivotally connected to a mounting post, a plate connected to one of said arms and carried in relation to said post and receivable within a groove in said plate, a detent member pivotally connected to said post defining an L-shaped groove for the reception of said pin, spring means automatically urging and detent member to lock the pin at one end of said L-shaped groove whereby the enlarger head is prevented from movement relative to the easel, and means for adjusting and locking said detent member relative to the plate to position said enlarger head precisely at said predetermined ratio.

12. Photographic apparatus for use in a system for the photographic identification of horses comprising a camera having a predetermined focal axis, a frame structure releasably connected to said camera in a predetermined position, a first lens system for taking close-up photographs, a second lens system for taking distant photographs, spacer arms included in said frame structure and extending forwardly of the focal plane of said camera, a masking plate connected to said spacer arms and positioned in the effective field of view of the focal axis of said camera and at a predetermined distance from the focal plane thereof, means including said masking plate defining at the outer edge surfaces thereof a plane set at the correct focal distance from the focal plane of the camera for close-up photography when using said close-up lens system, means for permitting removal of said masking plate from the effective field of view of the focal axis during distant photography, and means for preventing use of said distant lens system when said masking plate is positioned at said predetermined distance from the focal plane of said camera.

13. Photographic apparatus for use in a system for the photographic identification of horses comprising a camera having a predetermined focal axis and an adjustable camera lens of which the focal length is adjustable from a first position at which distant photographs may be taken to a second position at which close-up photographs may be taken when a supplementary close-up lens is placed in a predetermined series relationship with said camera lens, a frame structure releasably connected to said camera in a predetermined position and including spacer arms extending forwardly of the focal plane of said camera, a masking plate connected to said spacer arms and positioned in the effective field of view of the focal axis of said camera and at a predetermined distance from the focal plane of said camera when said frame structure is in said predetermined position, a supplementary close-up lens fixed to said frame structure, means including said masking place when positioned at said predetermined distance from the focal plane of the camera defining at the outer edge surfaces thereof a plane set at the correct focal distance from the focal plane of the camera for close-up photography when using said close-up lens, and means for releasably holding said frame structure on said camera in said predetermined position with said close-up lens in said predetermined series relationship with said camera lens when said camera lens is in said second position and for preventing such holding when said camera lens is in said first position.

14. Photographic apparatus for use in the photographic identification of horses comprising a camera having a predetermined focal axis, an adjustable camera lens rotatable in one direction about said axis to a first position where close-up photographs may be taken and in the opposite direction to a second position where distant photographs may be taken, a female socket member fixed to the forward end of said camera lens, a frame structure adapted to be releasably fixed to said camera and including spacer arms extending forwardly of the focal plane of said camera, a masking plate connected to said spacer arms and positioned in the field of view of the focal axis of said camera, a supplementary close-up lens fixed to said frame in alignment with a focal axis of said camera, means including said masking plate defining at the outer edge surfaces thereof a plane set at the correct focal distance from the focal plane of the camera for close-up photography when using said camera lens and supplementary lens, and a threaded male member threadably engaged within said socket member and releasably connecting said frame structure to said camera with said masking plate defining said plane when said male member is rotated in said one direction about the focal axis of said camera through its limit of rotative movement relative to said camera.

15. The photographic apparatus according to claim 14 wherein said camera further includes a viewing window used in conjunction with distant photography, a blocking arm movable fixed to said camera and movable from a first location covering said window to a second location spaced from said window, and means connecting said camera lens to said blocking arm for moving said blocking arm to said first location when the camera lens is rotated in said one direction about the focal axis of the camera and into said first position for close-up photography and to said second location when said camera lens is rotated in the opposite direction into said second position for distant photography.

16. Photographic apparatus for use in a system for the photographic identification of horses comprising a camera having a predetermined focal axis, a telescopic camera lens adjustably fixed to said camera for movement between a first position at which the forward end of the lens is disposed at a first distance from said camera for taking close-up photographs and a second position at which the forward end of the lens is disposed at a second distance from said camera greater than said first distance for taking distant photographs, a frame structure including a masking plate and supplementary close-up lens adapted to be releasably fixed to said camera in a predetermined position with said close-up lens and said masking plate positioned in the field of view of the focal axis of said camera, means including said masking plate defining at the outer edge surfaces thereof a plane set at the correct focal distance from the focal plane of the camera for close-up photography when said frame structure is fixed to the camera in said predetermined position, and means for releasably fixing said frame structure to the camera in locked relationship in said predetermined position when the camera lens is in said first position and for preventing the frame structure from being fixed in said locked relationship when said camera lens is in said second position.

17. The photographic apparatus according to claim 16 wherein said supplementary close-up lens is disposed immediately in front of the camera lens when said frame is in said predetermined position and wherein said means for releasably fixing said frame structure to said camera comprises a plurality of tubular members fixed to said camera and extending forwardly thereof along directions parallel to the focal axis of the camera, a plurality of male rod members fixed to said masking plate and telescopically received within said tubular members, detent openings in said tubular members and cooperating projections on said rod members for releasably locking said frame structure to said camera in said predetermined position, said detent openings and projections being in cooperative alignment with each other when said supplementary lens is disposed immediately in front of said camera lens and said camera lens is disposed in said first position.

References Cited by the Examiner
UNITED STATES PATENTS
2,377,954  6/1945  Mellien _____ 95—44

JOHN M. HORAN, Primary Examiner.